United States Patent
Li et al.

(10) Patent No.: US 11,418,918 B2
(45) Date of Patent: Aug. 16, 2022

(54) METHOD, APPARATUS, COMPUTER DEVICE AND STORAGE MEDIUM FOR STAY POINT RECOGNITION

(71) Applicant: BEIJING BAIDU NETCOM SCIENCE AND TECHNOLOGY CO., LTD., Beijing (CN)

(72) Inventors: Yanyan Li, Beijing (CN); Jianguo Duan, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/821,729

(22) Filed: Mar. 17, 2020

(65) Prior Publication Data
US 2021/0044930 A1 Feb. 11, 2021

(30) Foreign Application Priority Data
Aug. 7, 2019 (CN) .......................... 201910725243.4

(51) Int. Cl.
  *H04W 24/00* (2009.01)
  *H04W 4/029* (2018.01)
  *G06Q 50/14* (2012.01)
(52) U.S. Cl.
  CPC ............ *H04W 4/029* (2018.02); *G06Q 50/14* (2013.01)

(58) Field of Classification Search
  CPC .......... G01S 5/012; G01S 5/013; G01S 5/014; G01S 5/015; G01S 5/016; G01S 5/017; G01S 5/018; H04W 4/029
  See application file for complete search history.

(56) References Cited

U.S. PATENT DOCUMENTS

| 2010/0211308 A1* | 8/2010 | Zheng | ..................... G01C 21/20 701/533 |
| 2013/0130214 A1* | 5/2013 | Ohno | ................... G08G 1/0129 434/236 |

(Continued)

FOREIGN PATENT DOCUMENTS

| CN | 106203505 A | 12/2016 |
| CN | 106767835 A | 5/2017 |

(Continued)

OTHER PUBLICATIONS

First Office Action and Search Report from CN app. No. 201910725243. 4, dated Aug. 4, 2020, with English translation from Global Dossier.

(Continued)

*Primary Examiner* — Shantell L Heiber
(74) *Attorney, Agent, or Firm* — Ladas & Parry, LLP

(57) ABSTRACT

A method, an apparatus, a computer device and a storage medium for stay point recognition are disclosed. The method comprises: obtaining reference stay points corresponding to a to-be-recognized positioning point; selecting from the reference stay points a stay point in a predetermined relationship with the to-be-recognized positioning point; and determining whether the to-be-recognized positioning point is a stay point based on the stay point selected. The technical solution may improve the accuracy and recall rate of the stay point recognition.

9 Claims, 3 Drawing Sheets

(56) References Cited

U.S. PATENT DOCUMENTS

| | | | |
|---|---|---|---|
| 2014/0310366 A1 | 10/2014 | Fu et al. | |
| 2016/0180232 A1* | 6/2016 | Tsubouchi | G06N 7/005 |
| | | | 706/48 |
| 2017/0265030 A1* | 9/2017 | Jung | H04W 4/029 |
| 2017/0300919 A1* | 10/2017 | Chen | G06F 21/552 |

FOREIGN PATENT DOCUMENTS

| | | | |
|---|---|---|---|
| CN | 106951903 A | 7/2017 | |
| CN | 107016126 A | 8/2017 | |
| CN | 108122012 A | 6/2018 | |
| CN | 108168562 A | 6/2018 | |
| CN | 108256590 A | 7/2018 | |
| CN | 108804619 A | 11/2018 | |
| CN | 109068374 A | 12/2018 | |
| CN | 109195219 A | 1/2019 | |
| CN | 109635208 A | 4/2019 | |
| CN | 110096526 A | 8/2019 | |
| CN | 110677815 A | 1/2020 | |

OTHER PUBLICATIONS

First Office Action and search repurt from CN app. No. 201910725078.2, dated Nov. 12, 2021, with English translation from Global Dossier, all pages.

Feng et al., "Design and Implementation of Indoor Point of Interest Recommended System Based on Multi-mode", Computer Engineering, vol. 41 No. 8, Aug. 2015, all pages.

* cited by examiner

METHOD, APPARATUS, COMPUTER DEVICE AND STORAGE MEDIUM FOR STAY POINT RECOGNITION

CROSS REFERENCE TO RELATED APPLICATIONS

The present application claims the priority of Chinese Patent Application No. 201910725243.4, filed on Aug. 7, 2019. The disclosure of the above application is incorporated herein by reference in its entirety.

TECHNICAL FIELD

The present disclosure relates to computer application technologies, and particularly to a method, an apparatus, a computer device and a storage medium for stay point recognition.

BACKGROUND

In practical application, video, feed stream or the like may be pushed to a user based on the user's behavior patterns. The user's behavior patterns may be classified into two types: stay and move. Different behavior patterns may correspond to different push policies.

Correspondingly, the user's positioning point needs to be recognized to figure out whether the positioning point is a stay point or a moving point. At present, the following stay point recognition manners are usually employed: 1) a spatiotemporal window manner: this algorithm assumes that the user's positioning points are continuous trajectory points, and judges a point meeting specific temporal and spatial threshold conditions as the stay point; 2) a stay point recognition manner based on a wireless-fidelity (WiFi) connection, i.e., if it is determined that the user accesses the WiFi of a fixed Point Of Interest (POI) at the positioning point, the positioning point may be believed as a stay point.

However, the above two manners both have certain problems in the practical application, for example, the manner 1) can handle situations about the continuity and density of the trajectory points well, but cannot handle other situations well, and exhibits an undesirable accuracy and recall rate; in the manner 2), although the positioning point accessing the WiFi of the fixed POI is usually the stay point, stay points unnecessarily all access the WiFi of the fixed POI. For example, when the user is within a scenic spot without the coverage of the WiFi, the stay point cannot be recognized in this manner, so the recall rate of this manner is lower.

SUMMARY

In view of the above, the present disclosure proposes a method, an apparatus, a computer device and a storage medium for stay point recognition.

According to an embodiment of the present disclosure, a method for stay point recognition is proposed, and the method includes:

obtaining reference stay points corresponding to a to-be-recognized positioning point;

selecting from the reference stay points a stay point in a predetermined relationship with the to-be-recognized positioning point;

determining whether the to-be-recognized positioning point is a stay point based on the stay point selected.

According to an embodiment of the present disclosure, the reference stay points may include: a general-purpose stay point for different users and a dedicated stay points for a user corresponding to the to-be-recognized positioning point.

According to an embodiment of the present disclosure, the general-purpose stay point may include a positioning point located in an area of interest having a stay attribute.

According to an embodiment of the present disclosure, the dedicated stay point for the user may include one or both of the following:

a stay point in historical positioning points for the user, which is determined according to a result of clustering the historical positioning points for the user;

a positioning point in the historical positioning points for the user, which has accessed wireless fidelity WiFi of a fixed point of interest.

According to an embodiment of the present disclosure, the selecting, from the reference stay points, a stay point in a predetermined relationship with the to-be-recognized positioning point may include:

using the nearest neighbor algorithm to select from the reference stay points a stay point nearest to the to-be-recognized positioning point.

According to an embodiment of the present disclosure, the determining whether the to-be-recognized positioning point is a stay point based on the stay point selected may include:

if the to-be-recognized positioning point is located in an area of interest where a selected general-purpose stay point lies, determining that the to-be-recognized positioning point is the stay point.

According to an embodiment of the present disclosure, the determining whether the to-be-recognized positioning point is a stay point based on the stay point selected may include:

if a spatial distance between the to-be-recognized positioning point and a selected dedicated stay point is smaller than a predetermined threshold, determining that the to-be-recognized positioning point is the stay point.

According to an embodiment of the present disclosure, an apparatus for stay point recognition is proposed, and the apparatus includes: an obtaining unit, a selecting unit and a determining unit;

the obtaining unit is configured to obtain reference stay points corresponding to a to-be-recognized positioning point;

the selecting unit is configured to select from the reference stay points a stay point in a predetermined relationship with the to-be-recognized positioning point;

the determining unit is configured to determine whether the to-be-recognized positioning point is a stay point based on the stay point selected.

According to an embodiment of the present disclosure, the reference stay points may include: a general-purpose stay point for different users and a dedicated stay points for a user corresponding to the to-be-recognized positioning point.

According to an embodiment of the present disclosure, the general-purpose stay points may include a positioning point located in an area of interest having a stay attribute.

According to an embodiment of the present disclosure, the dedicated stay point for the user may include one or both of the following:

a stay point in historical positioning points for the user, which is determined according to a result of clustering the historical positioning points for the user;

a positioning point in the historical positioning points for the user which has accessed wireless fidelity WiFi of a fixed point of interest.

According to an embodiment of the present disclosure, the selecting unit uses the nearest neighbor algorithm to select from the reference stay points a stay point nearest to the to-be-recognized positioning point.

According to an embodiment of the present disclosure, the determining unit determines that the to-be-recognized positioning point is located in an area of interest where a selected general-purpose stay point lies, and determines that the to-be-recognized positioning point is the stay point.

According to an embodiment of the present disclosure, the determining unit determines that a spatial distance between the to-be-recognized positioning point and a selected dedicated stay point is smaller than a predetermined threshold, and determines that the to-be-recognized positioning point is the stay point.

According to an embodiment of the present disclosure, a computer device is proposed, and the computer device includes a memory, a processor and a computer program which is stored on the memory and runs on the processor, the processor, upon executing the program, implementing the above-mentioned method.

According to an embodiment of the present disclosure, a computer-readable storage medium on which a computer program is stored, the program, when executed by the processor, implementing the aforesaid method, is proposed.

As may be seen from the above introduction, according to technical solutions of the present disclosure, the reference stay points s may be obtained corresponding to the to-be-recognized positioning point, a stay point in a predetermined relationship with the to-be-recognized positioning point is selected from the reference stay points, and whether the to-be-recognized positioning point is the stay point may be determined based on the stay point selected. The technical solution may be applied to various situations, to improve the recall rate and accuracy of stay point recognition.

DETAILED DESCRIPTION OF EMBODIMENTS

Technical solutions of the present disclosure will be described in more detail in conjunction with figures and embodiments to make technical solutions of the present disclosure clear and more apparent.

It is to be noted that, the embodiments described here are partial embodiments of the present disclosure, not all embodiments. Based on embodiments in the present disclosure, all other embodiments obtained by those having ordinary skill in the art without making inventive efforts all fall within the protection scope of the present disclosure.

In addition, it should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
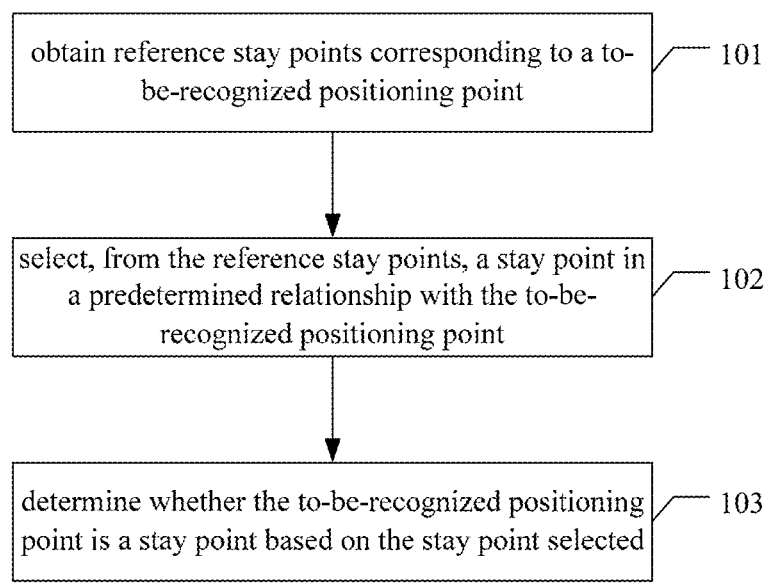
FIG. 1 is a flow chart of a method for stay point recognition according to a first embodiment of the present disclosure.

FIG. 1 is a flow chart of a method for stay point recognition according to a first embodiment of the present disclosure. As shown in FIG. 1, the method may include the following steps.

At 101, reference stay points are obtained corresponding to a to-be-recognized positioning point.

At 102, a stay point in a predetermined relationship with the to-be-recognized positioning point is selected from the reference stay points.

At 103, whether the to-be-recognized positioning point is a stay point is determined based on the stay point selected.

In the technical solution of this embodiment, the reference stay points, namely, high-probability stay points, may be obtained first. The reference stay points may include a general-purpose stay point universal for different users and a dedicated stay point for a user corresponding to the to-be-recognized positioning point.

The general-purpose stay point may include a positioning point located in an Area of Interest (AOI) having a stay attribute. The AOI may be referred to as information area and refers to an area-shaped geographical entity in map data.

The general-purpose stay point may be determined based on a spatial location attribute. Different positioning points in the space have different stay probabilities. For example, the positioning point on Beijing-Xinjiang Freeway is usually a moving point, whereas the positioning point in the Summer Palace is usually a stay point, and the Summer Palace is a POI having the AOI. Therefore, the positioning point located in the AOI having a stay attribute may be determined as a stay point.

Theoretically, all the positioning points located in the AOI having the stay attribute may be regarded as general-purpose stay points, or a positioning point in historical positioning points for each user which is located in the AOI having the stay attribute may be regarded as a general-purpose stay point.

How to obtain the historical positioning points for a user is not limited. In addition, the obtained historical positioning points for a user may refer to obtained historical positioning points of respective users within the latest predetermined time period. Each of the obtained historical positioning points may include information such as a user's identification, a positioning time, a positioning location (may be in the form of latitude and longitude) and the accessed WiFi.

For a well-known POI such as the abovementioned Summer Palace, its AOI may be easily obtained. The AOIs of some smaller POIs or POIs which are not well known might be obtained by virtue of specific means. For example, regarding the POI *scientific and technological park with 5,000 staff members, if it is found after analysis of historical data that many users access the WiFi corresponding to the *scientific and technological park every day, the AOI of the ***scientific and technological park may be determined according to these users' positioning locations.

The dedicated stay point for the user may include one or both of the following: a stay point in the historical positioning points for the user which is determined according to a result of clustering the historical positioning points for the user; a positioning point in the historical positioning points for the user which has accessed the WiFi of a fixed POI.

Usually, the user stays nearby his own resident address with a larger probability, so the user's resident address may be extracted. Specifically, it is feasible to obtain the user's historical positioning points, and perform clustering for the obtained historical positioning points. A clustering algorithm may be Density-Based Spatial Clustering of Applications with Noise (DBDCAN), Gaussian Mixed Model (GMM), mean-shift and so on. The stay point in the historical positioning points may be determined according to the clustering result, for example, a positioning point whose density value is greater than a predetermined threshold may be determined as a stay point.

In addition, generally, when the user stays, he accesses the WiFi of the fixed POI, so the accessed WiFi may act as a strong stay point feature. A positioning point accessing the WiFi of the fixed POI among the historical positioning points for the user may be determined as a stay point.

Each historical positioning point data may include information such as a user's identification, a positioning time, a positioning location and the accessed WiFi. Whether the historical positioning point is the stay point may be determined based on the accessed WiFi.

For the to-be-recognized positioning point, after reference stay points are obtained, namely, after the general-purpose stay point and the dedicated stay point for the user are obtained respectively, the stay point in a predetermined relationship with the to-be-recognized positioning point may be selected from these stay points.

For example, it is possible to use the nearest neighbor algorithm to select from the reference stay points a stay point nearest to the to-be-recognized positioning point. The nearest neighbor algorithm may be R-Tree algorithm, KD-Tree algorithm or the like.

Then, whether the to-be-recognized positioning point is the stay point may be determined based on the stay points selected. The stay points selected might only include a general-purpose stay point, might only include a dedicated stay point, or might include a general-purpose stay point as well as a dedicated stay point.

If the to-be-recognized positioning point is located in the AOI where a selected general-purpose stay point is located, it may be determined that the to-be-recognized positioning point is the stay point. Alternatively, if a spatial distance between the to-be-recognized positioning point and a selected dedicated stay point is smaller than a predetermined threshold, it may be determined that the to-be-recognized positioning point is the stay point.

Specific values of respective thresholds may depend on actual needs.

Figure 2:
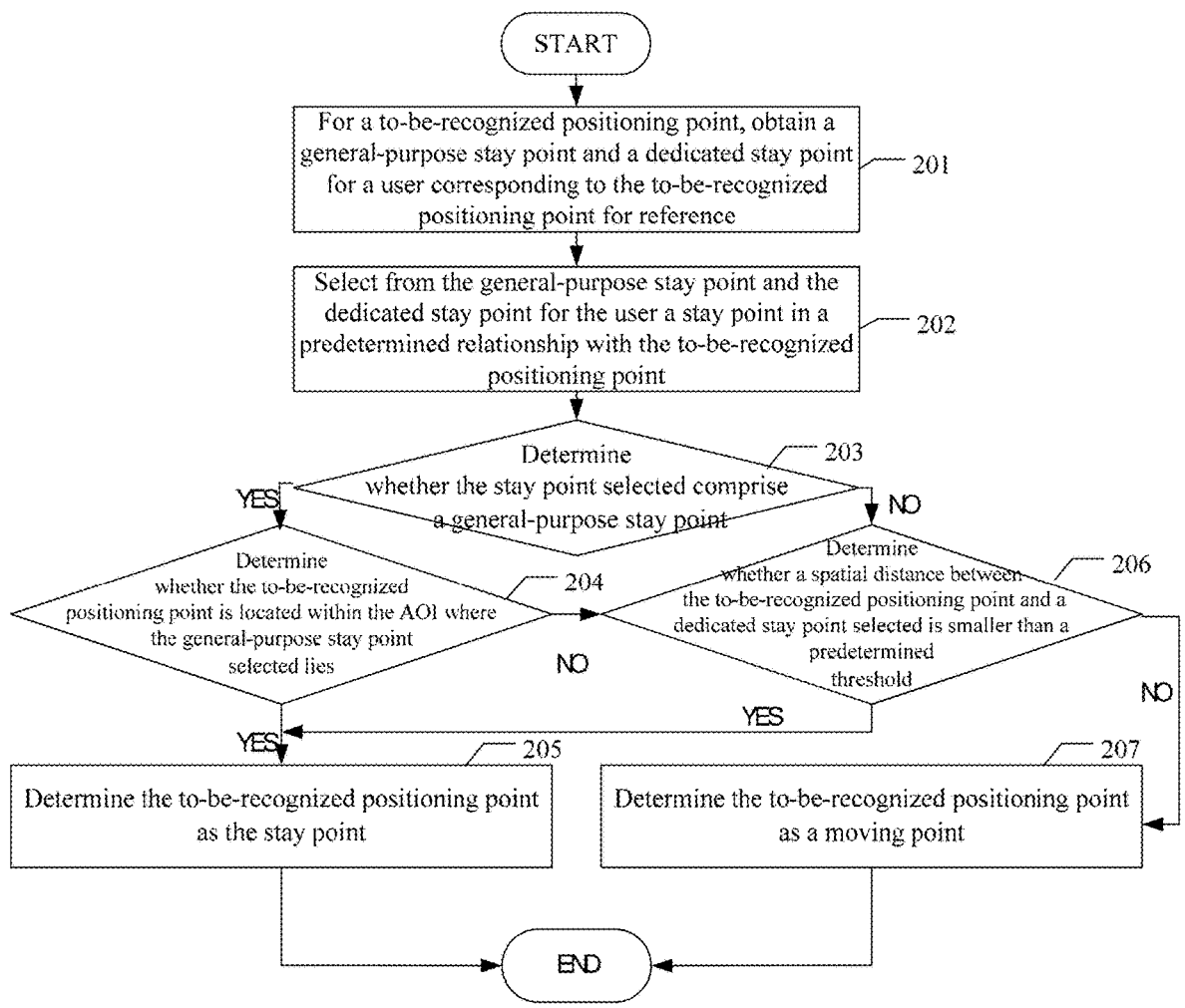
FIG. 2 is a flow chart of a method for stay point recognition according to a second embodiment of the present disclosure.

Based on the above introduction, FIG. 2 is a flow chart of a method for stay point recognition according to a second embodiment of the present disclosure. As shown in FIG. 2, the method includes the following steps.

At 201, a general-purpose reference stay point and a dedicated stay point for a user corresponding to the to-be-recognized positioning point are obtained for the to-be-recognized positioning point.

The general-purpose reference stay point and dedicated stay points for different users may be determined respectively in advance. The positioning point located in the AOI having the stay attribute may be determined as the general-purpose stay point. For a dedicated stay point for each user, it is possible to perform clustering for the historical positioning points for the user, determine the stay point from the historical positioning points according to the clustering result, and/or determine the positioning point accessing the WiFi of the fixed POI among the historical positioning points for the user as the stay point, and it is possible to regard the stay point determined in these manners as the dedicated stay point for the user.

It is feasible to, for the to-be-recognized positioning point, obtain information such as a user's identification, a positioning time and a positioning location of the positioning point and the accessed WiFi, determine the user corresponding to the to-be-recognized positioning point based on the user identification, thereby obtain the dedicated stay point corresponding to the user, and obtain a general-purpose stay point for different users.

At 202, a stay point in a predetermined relationship with the to-be-recognized positioning point is selected from the general-purpose stay point and dedicated stay point for the user.

For example, it is possible to use the nearest neighbor algorithm to select from the obtained general-purpose stay point and dedicated stay point a stay point nearest to the to-be-recognized positioning point. The nearest neighbor algorithm may be R-Tree algorithm, KD-Tree algorithm or the like.

At 203, determine whether the stay point selected includes a general-purpose stay point, and if yes, perform 204, otherwise perform 206.

The stay point selected might only include a general-purpose stay point, might only include a dedicated stay point, or might include a general-purpose stay point as well as a dedicated stay point. If the stay point selected include a general-purpose stay point, perform 204; if the stay point selected does not include a general-purpose stay point, perform 206.

At 204, determine whether the to-be-recognized positioning point is located within the AOI where a selected general-purpose stay point lies, and if yes, perform 205, or if no, perform 206.

If the selected stay point include two general-purpose stay points, referred to as general-purpose stay point A and general-purpose stay point B respectively for convenience of description, it is possible to first determine whether the to-be-recognized positioning point is located in the AOI where the general stay point A lies, namely, determine whether the positioning location of the to-be-recognized positioning point is located in the AOI where the general stay point A lies, and if yes, perform 205, or if no, further determine whether the to-be-recognized positioning point is located in the AOI where the general-purpose stay point B lies, and if yes, perform 205, or if no, perform 206.

At 205, the to-be-recognized positioning point is determined as the stay point, and then the flow ends.

At 206, determination is made whether a spatial distance between the to-be-recognized positioning point and a selected dedicated stay point is smaller than a predetermined threshold, and 205 is performed if yes, or 207 is performed if no.

If the selected stay point include two dedicated stay points, referred to as dedicated stay point C and dedicated stay point D respectively for convenience of description, it is possible to first determine whether a spatial distance between the to-be-recognized positioning point and the dedicated stay point C is smaller than a predetermined threshold, and if yes, perform 205, otherwise further determine whether a spatial distance between the to-be-recognized positioning point and the dedicated stay point D is smaller than a predetermined threshold, and if yes, perform 205, or if yes, perform 207.

At 207, the to-be-recognized positioning point is determined as a moving point, and then the flow ends.

It is to be noted that, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

To sum up, according to the solution of the above method embodiment, for to-be-recognized positioning point, reference stay points may be obtained correspondingly, and a stay point in a predetermined relationship with the to-be-recognized positioning point may be selected from the reference stay points, and whether the to-be-recognized positioning point is the stay point may be determined based on the stay point selected. The technical solution may be applied to various situations, and the recall rate and accuracy of stay points recognition may be improved.

The above introduces the method embodiments. The technical solution of the present disclosure will be further described through an apparatus embodiment.

Figure 3:
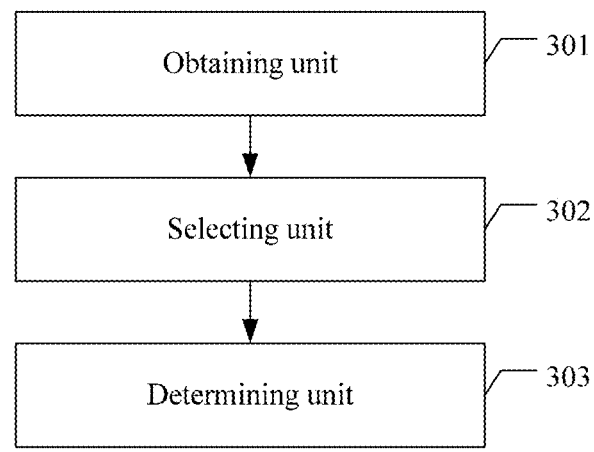
FIG. 3 is a block diagram of an apparatus for stay point recognition according to an embodiment of the present disclosure.

FIG. 3 is a block diagram of an apparatus for stay point recognition according to an embodiment of the present disclosure. As shown in FIG. 3, the apparatus includes: an obtaining unit 301, a selecting unit 302 and a determining unit 303.

The obtaining unit 301 is configured to obtain a reference stay point corresponding to a to-be-recognized positioning point.

The selecting unit 302 is configured to select from the reference stay points a stay point in a predetermined relationship with the to-be-recognized positioning point.

The determining unit 303 is configured to determine whether the to-be-recognized positioning point is a stay point based on the stay point selected.

In the technical solution of this embodiment, the reference stay points, namely, high-probability stay points, may be obtained first. The reference stay points may include a general-purpose stay point universal for different users and a dedicated stay point for a user corresponding to the to-be-recognized positioning point.

The general-purpose stay point may include a positioning point located in an AOI having a stay attribute. The AOI may be referred to as information area and refers to an area-shaped geographical entity in map data.

Theoretically, all the positioning points located in the AOI having the stay attribute may be regarded as general-purpose stay points, or positioning points which are in obtained historical positioning points for the user and are located in the AOI having the stay attribute may be regarded as general-purpose stay points.

The dedicated stay points for the user may include one or all of the following: a stay point in the historical positioning points for the user determined according to a result of clustering the historical positioning points for the user; a positioning point in the historical positioning points for the user which has accessed the WiFi of a fixed POI.

Usually, the user stays nearby his/her resident address with a larger probability, so the user's resident address may be extracted. Specifically, it is feasible to obtain the historical positioning points for the user, and perform clustering for the obtained historical positioning points, and thereby determine the stay point in the historical positioning points according to the clustering result.

In addition, generally, only when the user stays, he may accesses the WiFi of the fixed POI, so the accessed WiFi may act as a strong stay point feature. A positioning point in the historical positioning points for the user which has accessed the WiFi of the fixed POI may be determined as the stay point.

For the to-be-recognized positioning point, after the reference stay points are obtained, namely, after a general-purpose stay point and a dedicated stay point for the user corresponding to the to-be-recognized positioning point are obtained respectively, the selecting unit 302 may select from these reference stay points a stay point in a predetermined relationship with the to-be-recognized positioning point.

For example, the selecting unit 302 may use the nearest neighbor algorithm to select from the reference stay points a stay point nearest to the to-be-recognized positioning point.

Then, the determining unit 303 may determine whether the to-be-recognized positioning point is the stay point based on the stay point selected. The stay point selected might only include a general-purpose stay point, might only include a dedicated stay point, or might include a general-purpose stay point as well as a dedicated stay point.

If the to-be-recognized positioning point is located in the AOI where a selected general-purpose stay point is located, it may be determined that the to-be-recognized positioning point is the stay point. Alternatively, if a spatial distance between the to-be-recognized positioning point and a selected dedicated stay point is smaller than a predetermined threshold, it may be determined that the to-be-recognized positioning point is the stay point.

A specific workflow of the apparatus embodiment shown in FIG. 3 will not be detailed any more here, and reference may be made to corresponding description in the above method embodiment.

Figure 4:
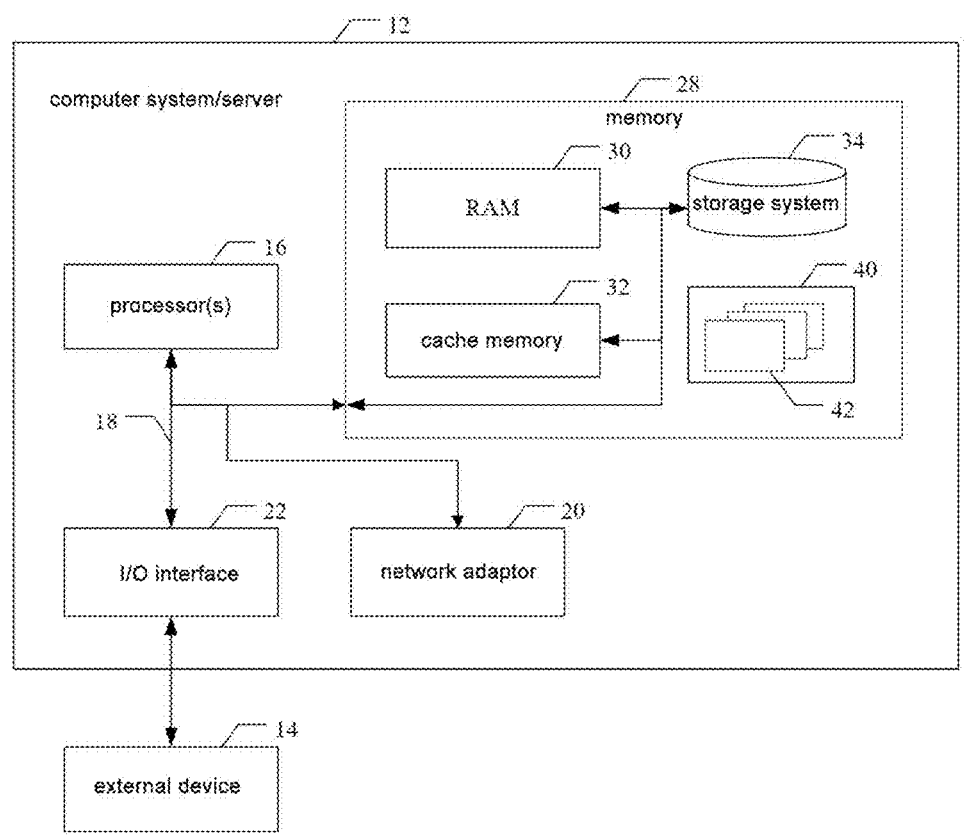
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1 or FIG. 2.

The present disclosure meanwhile provides a computer-readable storage medium on which a computer program is stored, the program, when executed by the processor, implementing the method stated in the embodiment shown in FIG. 1 or FIG. 2.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the proposed apparatus and methods may be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for stay point recognition, wherein the method comprises:
    obtaining reference stay points corresponding to a to-be-recognized positioning point, the reference stay points comprising: a dedicated stay point for a user corresponding to the to-be-recognized positioning point and a general-purpose stay point universal for different users, wherein the obtaining the reference stay points comprises determining the user corresponding to the to-be-recognized positioning point based on a user identification corresponding to the to-be-recognized positioning point to obtain the dedicated stay point corresponding to the user, and obtaining the general-purpose stay point for different users, wherein the general-purpose stay point is determined based on a spatial location attribute and comprises a positioning point located in an area of interest having a stay attribute, the area of interest referring to an area-shaped geographical entity in map data, and the dedicated stay point for each user comprises one or both of the following: a stay point, in historical positioning points for the user, which is determined according to a result of clustering the historical positioning points for the user; and a positioning point, in the historical positioning points for the user, which has accessed wireless fidelity WiFi of a fixed point of interest;
    using a nearest neighbor algorithm to select, from the reference stay points, a stay point nearest to the to-be-recognized positioning point; and
    determining whether the to-be-recognized positioning point is a stay point based on the stay point selected.

2. The method according to claim 1, wherein the determining whether the to-be-recognized positioning point is a stay point based on the stay point selected comprises:
    in a case that the to-be-recognized positioning point is located in an area of interest where a selected general-purpose stay point lies, determining that the to-be-recognized positioning point is the stay point.

3. The method according to claim 1, wherein the determining whether the to-be-recognized positioning point is a stay point based on the stay point selected comprises:
    in a case that a spatial distance between the to-be-recognized positioning point and a selected dedicated stay point is smaller than a predetermined threshold, determining that the to-be-recognized positioning point is the stay point.

4. A computer device, comprising a memory, a processor and a computer program which is stored on the memory and runs on the processor, wherein the processor, upon executing the program, implements a method for stay point recognition, wherein the method comprises:
    obtaining reference stay points corresponding to a to-be-recognized positioning point, the reference stay points comprising: a dedicated stay point for a user corresponding to the to-be-recognized positioning point and a general-purpose stay point universal for different users, wherein the obtaining the reference stay points comprises determining the user corresponding to the to-be-recognized positioning point based on a user identification corresponding to the to-be-recognized positioning point to obtain the dedicated stay point corresponding to the user, and obtaining the general-purpose stay point for different users, wherein the general-purpose stay point is determined based on a spatial location attribute and comprises a positioning point located in an area of interest having a stay attribute, the area of interest referring to an area-shaped geographical entity in map data, and the dedicated stay point for each user comprises one or both of the following: a stay point, in historical positioning points for the user, which is determined according to a result of clustering the historical positioning points for the user; and a positioning point, in the historical positioning points for the user, which has accessed wireless fidelity WiFi of a fixed point of interest;
    using a nearest neighbor algorithm to select, from the reference stay points, a stay point nearest to the to-be-recognized positioning point; and
    determining whether the to-be-recognized positioning point is a stay point based on the stay point selected.

5. The computer device according to claim 4, wherein the determining whether the to-be-recognized positioning point is a stay point based on the stay point selected comprises:
    in a case that the to-be-recognized positioning point is located in an area of interest where a selected general-purpose stay point lies, determining that the to-be-recognized positioning point is the stay point.

6. The computer device according to claim 4, wherein the determining whether the to-be-recognized positioning point is a stay point based on the stay point selected comprises:
    in a case that a spatial distance between the to-be-recognized positioning point and a selected dedicated stay point is smaller than a predetermined threshold, determining that the to-be-recognized positioning point is the stay point.

7. A non-transitory computer-readable storage medium on which a computer program is stored, wherein the program, when executed by a processor, implements a method for stay point recognition, wherein the method comprises:
    obtaining reference stay points corresponding to a to-be-recognized positioning point, the reference stay points comprising: a dedicated stay point for a user corresponding to the to-be-recognized positioning point and a general-purpose stay point universal for different users, wherein the obtaining the reference stay points comprises determining the user corresponding to the to-be-recognized positioning point based on a user identification corresponding to the to-be-recognized positioning point to obtain the dedicated stay point corresponding to the user, and obtaining the general-purpose stay point for different users, wherein the general-purpose stay point is determined based on a spatial location attribute and comprises a positioning point located in an area of interest having a stay attribute, the area of interest referring to an area-shaped geographical entity in map data, and the dedicated stay point for each user comprises one or both of the following: a stay point, in historical positioning points for the user, which is determined according to a result of clustering the historical positioning points for the user; and a positioning point, in the historical positioning points for the user, which has accessed wireless fidelity WiFi of a fixed point of interest;

using a nearest neighbor algorithm to select, from the reference stay points, a stay point nearest to the to-be-recognized positioning point; and determining whether the to-be-recognized positioning point is a stay point based on the stay point selected.

8. The non-transitory computer-readable storage medium according to claim 7, wherein the determining whether the to-be-recognized positioning point is a stay point based on the stay point selected comprises:

in a case that the to-be-recognized positioning point is located in an area of interest where a selected general-purpose stay point lies, determining that the to-be-recognized positioning point is the stay point.

9. The non-transitory computer-readable storage medium according to claim 7, wherein the determining whether the to-be-recognized positioning point is a stay point based on the stay point selected comprises:

in a case that a spatial distance between the to-be-recognized positioning point and a selected dedicated stay point is smaller than a predetermined threshold, determining that the to-be-recognized positioning point is the stay point.

* * * * *